United States Patent
Kleman

(10) Patent No.: US 9,541,444 B2
(45) Date of Patent: Jan. 10, 2017

(54) SELF-DIAGNOSING FMCW RADAR LEVEL GAUGE

(71) Applicant: Rosemount Tank Radar AB, Gothenburg (SE)

(72) Inventor: Mikael Kleman, Vreta Kloster (SE)

(73) Assignee: Rosemount Tank Radar AB, Gothenburg (SE)

( * ) Notice: Subject to any disclaimer, the term of this patent is extended or adjusted under 35 U.S.C. 154(b) by 340 days.

(21) Appl. No.: 14/242,054

(22) Filed: Apr. 1, 2014

(65) Prior Publication Data

US 2015/0276462 A1 Oct. 1, 2015

(51) Int. Cl.
  *G01F 23/284* (2006.01)
  *G01S 7/40* (2006.01)
  (Continued)

(52) U.S. Cl.
  CPC ......... *G01F 23/284* (2013.01); *G01F 25/0076* (2013.01); *G01S 7/4017* (2013.01);
  (Continued)

(58) Field of Classification Search
  CPC ........ G01F 23/22; G01F 23/28; G01F 23/284; G01F 25/0061; G01F 25/0076; G01S 7/02; G01S 7/40; G01S 7/4004; G01S 7/4017; G01S 7/4056; G01S 7/4052; G01S 2007/406; G01S 2007/4078; G01S 13/02; G01S 13/06; G01S 13/08; G01S 13/32; G01S 13/34; G01S 13/343; G01S 13/88; G01S 7/52; G01S 7/52004; G01S 13/36
  See application file for complete search history.

(56) References Cited

U.S. PATENT DOCUMENTS 4,044,353 A * 8/1977 Levy ................. G01S 13/36
  342/124
4,665,403 A * 5/1987 Edvardsson .......... G01F 23/284
  342/124
(Continued)

FOREIGN PATENT DOCUMENTS

DE  10 2009 042 869  2/2011
EP      2 631 612   8/2013
WO   WO 2012159682  11/2012

OTHER PUBLICATIONS

"Notification of Transmittal of the International Search Report and the Written Opinion of the International Searching Authority", from PCT/EP2015/057154, dated Jun. 18, 2015.

*Primary Examiner* — Bernarr Gregory
(74) *Attorney, Agent, or Firm* — Westman, Champlin & Koehler, P.A.

(57) ABSTRACT

A self-diagnosing FMCW radar level gauge and a method for providing self-diagnosing with a radar level gauge is provided in a radar level gauge comprising a transceiver, a mixer, a signal propagating device and a signal propagation path connecting the transceiver and the signal propagating device, a filter arrangement and processing circuitry. The filter arrangement provides a filtered intermediate frequency signal. The transceiver outputs either a diagnostic sweep configured such that a reference echo from the signal propagation path is detectable in said filtered intermediate frequency signal, or a measurement sweep configured such that the reference echo is suppressed in the filtered intermediate frequency signal and that a surface echo is detectable. The processing circuitry is configured to self-diagnose the radar level gauge based on the reference echo, and to determine the distance to the surface based on the surface echo.

28 Claims, 6 Drawing Sheets

(51) Int. Cl.
  *G01F 25/00* (2006.01)
  *G01S 13/34* (2006.01)
  *G01S 13/88* (2006.01)
  *G01F 23/00* (2006.01)
  *G01S 7/00* (2006.01)

(52) U.S. Cl.
  CPC .......... *G01S 7/4056* (2013.01); *G01S 13/343* (2013.01); *G01S 13/88* (2013.01); *G01S 2007/4078* (2013.01)

(56) References Cited

U.S. PATENT DOCUMENTS

| | | | |
|---|---|---|---|
| 5,053,775 A * | 10/1991 | Mawhinney | G01S 13/34 342/124 |
| 5,614,911 A | 3/1997 | Otto et al. | |
| 5,841,393 A | 11/1998 | Saito et al. | |
| 6,295,018 B1 | 9/2001 | Diede et al. | |
| 6,690,320 B2 * | 2/2004 | Benway | G01F 23/284 324/332 |
| 6,771,560 B2 * | 8/2004 | Lyon | G01S 7/52004 367/13 |
| 6,906,662 B2 * | 6/2005 | Faust | G01F 23/284 342/124 |
| 7,053,630 B2 * | 5/2006 | Westerling | G01F 23/284 324/639 |
| 7,319,401 B2 * | 1/2008 | Akerstrom | G01F 23/284 340/612 |
| 7,525,476 B1 * | 4/2009 | Delin | G01S 7/4056 324/600 |
| 7,586,435 B1 * | 9/2009 | Edvardsson | G01F 23/284 324/600 |
| 7,710,314 B2 * | 5/2010 | Benari | G01S 7/4052 342/124 |
| 8,009,085 B2 * | 8/2011 | Kuhlow | G01F 23/284 324/600 |
| 8,031,108 B2 * | 10/2011 | Burcea | G01F 23/284 342/124 |
| 8,497,799 B2 * | 7/2013 | Kleman | G01F 23/284 342/118 |
| 9,024,807 B2 * | 5/2015 | Widahl | G01F 23/284 342/124 |
| 2006/0015292 A1 | 1/2006 | Lubcke | |
| 2009/0302867 A1 | 12/2009 | Schroth et al. | |
| 2012/0056774 A1 | 3/2012 | Wennerberg et al. | |
| 2013/0213132 A1 | 8/2013 | Wegemann | |

* cited by examiner

SELF-DIAGNOSING FMCW RADAR LEVEL GAUGE

FIELD OF THE INVENTION

The present invention relates to a self-diagnostic FMCW radar level gauge and to methods for using diagnostic sweeps to provide self-diagnosis of a FMCW radar level gauge.

BACKGROUND OF THE INVENTION

Radar level gauges are in wide use for measuring the filling level of a product contained in a tank. Radar level gauging is generally performed either by means of non-contact measurement, whereby transmitted electromagnetic signals are radiated towards the product contained in a tank, or by means of contact measurement, often referred to as guided wave radar (GWR), whereby transmitted electromagnetic signals are guided towards and into the product by a probe acting as a waveguide.

Radar level gauges are often classified as either pulsed system or FMCW-systems. In FMCW-systems, a signal with varying frequency is transmitted towards the surface and the distance is determined based on the frequency (and/or phase) difference between a transmitted signal and a simultaneously received signal. The transmitted signal is reflected by the surface of the contents in the tank (or by any other impedance transition) and an echo signal, which has been delayed a certain time, is returned to the gauge. The echo signal is mixed with the transmitted signal to generate a mixer signal, having a frequency equal to the frequency change of the transmitted signal that has taken place during the time delay. For a linear sweep, this difference frequency, also referred to as an intermediate frequency (IF), is proportional to the distance to the reflecting surface. The mixer signal is often referred to as an IF signal. The IF-signal will also comprise frequency components from reflections in the antenna and similar near-zone echoes. These near-zone echoes are very strong due to them occurring close to the transceiver, and thus making it hard to detect the surface echo. Hence, radar level gauges have filters which filter the IF-signal prior to any sampling, thereby suppressing frequency components which are not related to the surface in order to get good measurement data.

Radar level gauges are in many cases used for applications where malfunction of the radar level gauge could result in dangerous situations, and therefore radar level gauges must be extremely reliable. Various measures are taken to ensure the reliability of radar level gauges, and to thereby reduce the risk of dangerous situations. For instance, by performing a self-diagnostic function the radar level gauge may be proof tested to ensure that it is working properly. One way to perform a self-diagnostic function is to measure a reference echo, this will proof test the components of a radar level gauge which are related to generating, guiding, filtering, amplifying, transmitting and/or receiving electromagnetic signals, also known as the microwave chain.

U.S. Pat. No. 5,614,911 describes a FMCW radar level gauge where problems such as the formation of a deposit on the antenna, or other trouble such as damage or loss of the antenna may be detected. The problems are detected by first storing an undisturbed reference function, i.e. a tank spectrum, before the radar level gauge is put into actual operation. During actual operation, the measured echo function is compared to the stored undisturbed echo function and any differences are analyzed and evaluated to recognize the formation of deposits or other trouble. Similarly, US patent application 2006/0015292 is a time-domain-reflectometry (TDR) radar level gauge which may detect accretion of material on the antenna or malfunction of the electronics of the TDR radar level gauge. A constant measurement of the distance to a surface over a predetermined time interval is used to recognize accretion of material on the antenna or malfunction of the electronics of the TDR radar level gauge such as a short-circuit in the coupling between the antenna and the electronics. However, as antenna echoes are different for each antenna and as they degrade and change over time they are not suitable to use for a diagnostic functionality.

GENERAL DISCLOSURE OF THE INVENTION

With regards to the above-mentioned desired properties of a radar level gauge, it is a general object of the present invention to enable proof testing of an FMCW radar level gauge by providing a reference echo without adding components or costs to the radar level gauge.

The present invention is based upon the realization that by configuring the relation between distance and frequency in a frequency sweep for an FMCW radar level gauge, an adapted frequency sweep is provided whereby echoes in the signal propagation path from the transceiver to a signal propagation device are not discriminated. Thereby, the echoes in the propagation path will provide a detectable reference echo in order to enable the radar level gauge to self-diagnose the microwave chain.

According to a first aspect of the present invention, these and other objects are achieved through a self-diagnosing FMCW radar level gauge for measuring a distance to a surface of a product contained in a tank. The radar level gauge comprises a transceiver arranged to generate and transmit an electromagnetic transmit signal in the form of a frequency sweep, and a signal propagating device and a signal propagation path which connects the signal propagating device to the transceiver. The signal propagation path and the signal propagating device are configured to guide the electromagnetic transmit signal towards the surface, and return an echo signal including reflections from the surface and an impedance transition in the signal propagation path. The radar level gauge further comprises a mixer connected to the transceiver, and configured to mix the echo signal with a portion of the electromagnetic transmit signal to provide an intermediate frequency signal. A filter arrangement is connected to the mixer and configured to filter the intermediate frequency signal in order to provide a filtered intermediate frequency signal, and processing circuitry is connected to the filter arrangement and configured to process the filtered intermediate frequency signal. The frequency sweep is one of a diagnostic sweep and a measurement sweep, where the diagnostic sweep is configured such that a reference echo is detectable in the filtered intermediate frequency signal, the reference echo being indicative of a distance to the impedance transition. The measurement sweep is configured such that the reference echo is suppressed in the filtered intermediate frequency signal, and that a surface echo is detectable in the filtered intermediate frequency signal, the surface echo being indicative of a distance to the surface. The processing circuitry is configured to self-diagnose the radar level gauge based on the reference echo, and to determine the distance to the surface based on the surface echo.

According to a second aspect of the present invention, the objects are also achieved by a method for providing self-diagnosis of a FMCW radar level gauge for measuring a distance to a surface of a product contained in a tank. The method comprises generating an electromagnetic transmit signal in the form of a frequency sweep, and guiding the electromagnetic transmit signal via a signal propagation path and a signal propagating device towards the surface. The method further comprises returning an echo signal including reflections from the surface and an impedance transition in the signal propagation path, and mixing the echo signal and the transmit signal to provide an intermediate frequency signal. The intermediate frequency signal is filtered to provide a filtered intermediate frequency signal. The frequency sweep is one of a diagnostic sweep and a measurement sweep, where the diagnostic sweep is configured such that a reference echo is detectable in the filtered intermediate frequency signal, the reference echo being indicative of a distance to the impedance transition. The measurement sweep is configured such that the reference echo is suppressed in the filtered intermediate frequency signal, and that a surface echo is detectable in the filtered intermediate frequency signal, the surface echo being indicative of a distance to the surface. The method further comprises processing the filtered intermediate frequency signal to self-diagnose the radar level gauge based on the reference echo, and to determine the distance to the surface based on the surface echo.

The diagnostic sweep is such that the filtered intermediate frequency comprises echoes from impedance transitions in the propagation path from the transceiver to the signal propagation device.

The signal propagation path should be construed as the connection between a microwave source comprised in the transceiver and the signal propagating device. Thus, impedance transitions along this path include a transition created by the connection to the signal propagating device e.g. an antenna.

The echoes from the propagation path are much closer than the echoes below the signal propagation device, and will be much stronger than the echoes from e.g. the surface of the product. Therefore in a normal FMCW radar level gauge those strong echoes, which comprise low frequencies, will be filtered out or suppressed by the filter arrangement. Otherwise the radar level gauge would not be able to detect the echo received from the surface and hence not be able to determine the distance to the surface. At least one additional advantage with the present invention is that the reference echo is provided from the propagation path and will be the same regardless of the signal propagation device used or other conditions. Yet another additional advantage is that radiated power in each sweep is efficiently used for the purpose at hand, a measurement sweep will measure the distance to the surface, whereas the diagnostic sweep will enable the diagnostic function. Therefore the present invention provides a reliable and simple way to proof test a FMCW radar level gauge without adding components or large costs.

The measurement sweep should be understood as an 'ordinary' FMCW sweep in which the echoes from the propagation path are suppressed by the filter arrangement.

To self-diagnose the radar level gauge, the processing circuitry may further comprise a self-diagnosis block configured to compare the reference echo against a stored reference echo profile. It should be understood that by configuring the diagnostic sweep the reference echo will be detectable at an expected position, i.e. distance, and/or expected amplitude. Therefore the stored reference echo profile may advantageously comprise information regarding an expected distance and/or an expected amplitude of the reference echo for a certain configuration of the diagnostic sweep. Hence, if the reference echo does not appear at an expected distance and/or with an expected amplitude, the self-diagnosis block of the processing circuitry can self-diagnose the radar level gauge and determine whether the microwave chain is functioning in an expected manner.

In order to enable the filtered intermediate frequency signal to comprise echoes from the propagation path, the diagnostic sweep may be configured with a shorter sweep time than the measurement sweep. In various embodiments the same effect may be enabled by configuring the diagnostic sweep with a larger sweep bandwidth than the measurement sweep. A combination of the two configurations is also possible. Hence, it should be understood that increasing the frequency per time unit in the frequency sweep allows the echoes in the propagation path to be detected. For some embodiments the sweep time of the diagnostic sweep may be two times shorter than the sweep time of the measurement sweep. For other embodiments the sweep time of the diagnostic sweep may be four times shorter than the sweep time of the measurement sweep. Accordingly, in other exemplary embodiments of the present invention the diagnostic sweep may be arranged to have a diagnostic sweep bandwidth which is two or four times greater than the measurement sweep bandwidth.

The filter arrangement may advantageously be configured to suppress the intermediate frequency signals which correspond to the reference echoes in a measurement sweep, or amplify the echo corresponding to the distance (and thus reference echo) in a diagnostic sweep. Thus, in various embodiments the filter arrangement may comprise high pass filters and low pass filters. The filtered intermediate frequency signal may therefore be seen as compensated in at least amplitude regarding the distance from the transceiver. The power radiated from an electromagnetic source decays according to an inverse square law, without the compensation for the distance from the filter arrangement the signal from the propagation path and the antenna connection would be orders of magnitude larger than the echo from the surface. Furthermore, a low pass filter may enable the filter arrangement to anti-alias i.e. filter out high frequencies, such as frequencies higher than half the sampling frequency of the processing circuitry. In embodiments where a low pass filter is present the reflection from the surface may be filtered out and thus not measurable during the diagnostic sweep.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an embodiment of the invention.

DETAILED DESCRIPTION OF THE PREFERRED EMBODIMENTS

In the present description, embodiments of the present invention are mainly described with reference to a radar level gauge having a free propagating antenna for radiating and capturing an electromagnetic signal. It should be noted that this by no means limits the scope of the invention, which is equally applicable to other signal propagating devices, including other free propagating antennas such as a rod antenna, a patch antenna, a fixed or movable parabolic antenna or a conical antenna, and wave guides for guided wave radar application, such as a still pipe, a transmission line or a probe, such as a single-line probe (including so-called Sommerfeld-probe or Goubau-probe), a twin-line probe or a coaxial probe.

Further, in the following description, embodiments of the present invention are mainly described with reference to an FMCW radar level gauge using a stepped frequency sweep. It is noted that the present invention is advantageous in any sampled FMCW, such as a FMCW using a continuous frequency sweep, or even in other types of radar systems using frequency sweeps.

Figure 1:
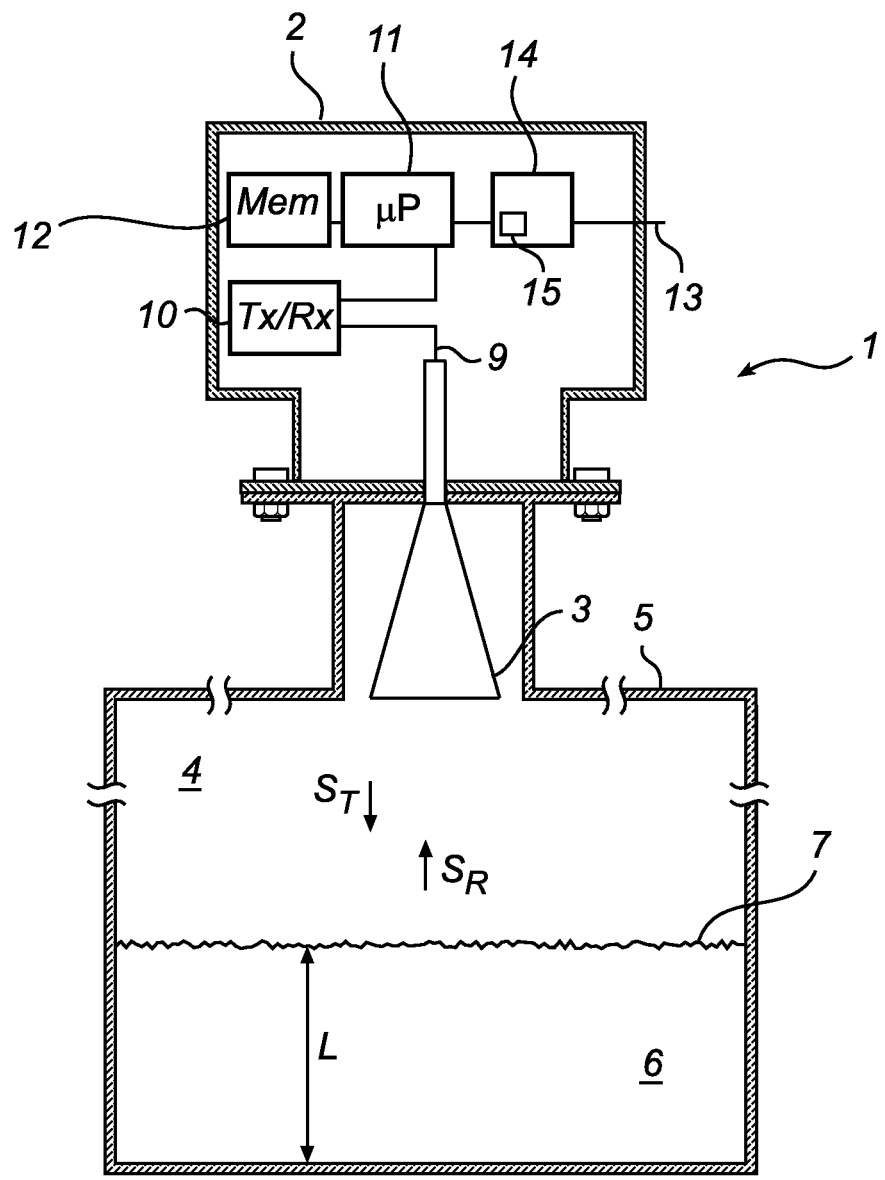
FIG. 1 is a schematic representation of a self-diagnosing FMCW radar level gauge according to a first embodiment of the present invention.

FIG. 1 schematically illustrates a radar level gauge 1 according to an embodiment of the present invention, comprising a measurement electronics unit 2, and a signal propagating device, here a horn antenna 3. The radar level gauge 1 is provided on a tank 5, which is partly filled with a product 6 to be gauged. The tank 5 may be any container or vessel capable of containing a product, and may be metallic, or partly or completely non-metallic, open, semi-open, or closed. The product 6 in the tank may be a liquid, a liquid gas, or even a solid, such as grain or plastic pellets. The FMCW measurement method provides a relatively high measurement sensitivity of the radar level gauge, enabling reliable measurement results also when interfering objects are present in the tank. By analyzing transmitted signal $S_T$ being radiated by the antenna 3 towards the surface 7 of the product 6, and echo signal $S_R$ traveling back from the surface 7, the measurement electronics unit 2 can determine the distance between a reference position and the surface 7 of the product 6, whereby the filling level L can be deduced. It should be noted that, although a tank 5 containing a single product 6 is discussed herein, the distance to any material interface present in the tank 5 can be measured in a similar manner. Furthermore the transmitted signal $S_T$ being radiated by the antenna 3 towards the surface 7, often comprises a frequency spectrum of 9 to 11 GHz or a frequency spectrum of 24 to 27 GHz. In some cases, for example when using a waveguide and performing contact measurement the signal often comprises a frequency spectrum of 1 to 3 GHz.

As is schematically illustrated in FIG. 1, the electronics unit 2 comprises a transceiver 10 for transmitting and receiving electromagnetic signals. The transceiver 10 is connected to the antenna 3 via a connection line 9. The connection line 9 may be any suitable signal medium, such as a coaxial cable or any electromagnetic waveguide. The unit 2 further comprises processing circuitry 11, which is connected to the transceiver 10 for control of the transceiver 10 and processing of signal received by the transceiver 10 to determine the filling level of the product 6 in the tank 5. The processing circuitry 11 is also connected to a memory 12, storing any software required for the operation of the radar level gauge 1, and also providing RAM used during operation.

The processing circuitry 11 is further connectable to external communication lines 13 for analog and/or digital communication via an interface 14. As an example, the communication between the communication interface 14 and an external control station (not shown) can be provided by a two-wire interface, which has a combined function of both transmitting the measurement result to the control station and receiving power for operation of the gauge 1. Such a two-wire interface may provide a more or less constant power, and the measurement result can be superimposed on the power voltage using a digital protocol, such as Fieldbus Foundation, HART or Profibus. Alternatively, the current in the lines is regulated in accordance with the prevailing measurement result. An example of such an interface is the 4-20 mA industrial loop, where the current is regulated between 4 and 20 mA, depending on the measurement result. Alternatively, the radar level gauge 1 may communicate wirelessly with the control station using e.g. a Wireless HART protocol, and use a local power supply (not shown) with batteries or other means of scavenging energy for autonomous operation.

The interface 14 here includes power management circuitry, including a power store 15 for storing power during periods when the microwave unit is inactive, thereby enabling higher power consumption during periods when the microwave unit is active (i.e. during the sweep). With such power management, lower average power consumption may be achieved, while still allowing short periods of higher power consumption. The power store 15 may include a capacitance, and may be restricted by space requirements as well as intrinsic safety requirements (applying when the gauge 1 is arranged in the hazardous zone of a tank with explosive or flammable contents)

Although being shown as separate blocks in FIG. 1, several of the transceiver 10, the processing circuitry 11 and the interface 14 may be provided on the same circuit board, or even in the same integrated circuit (IC).

Figure 2:
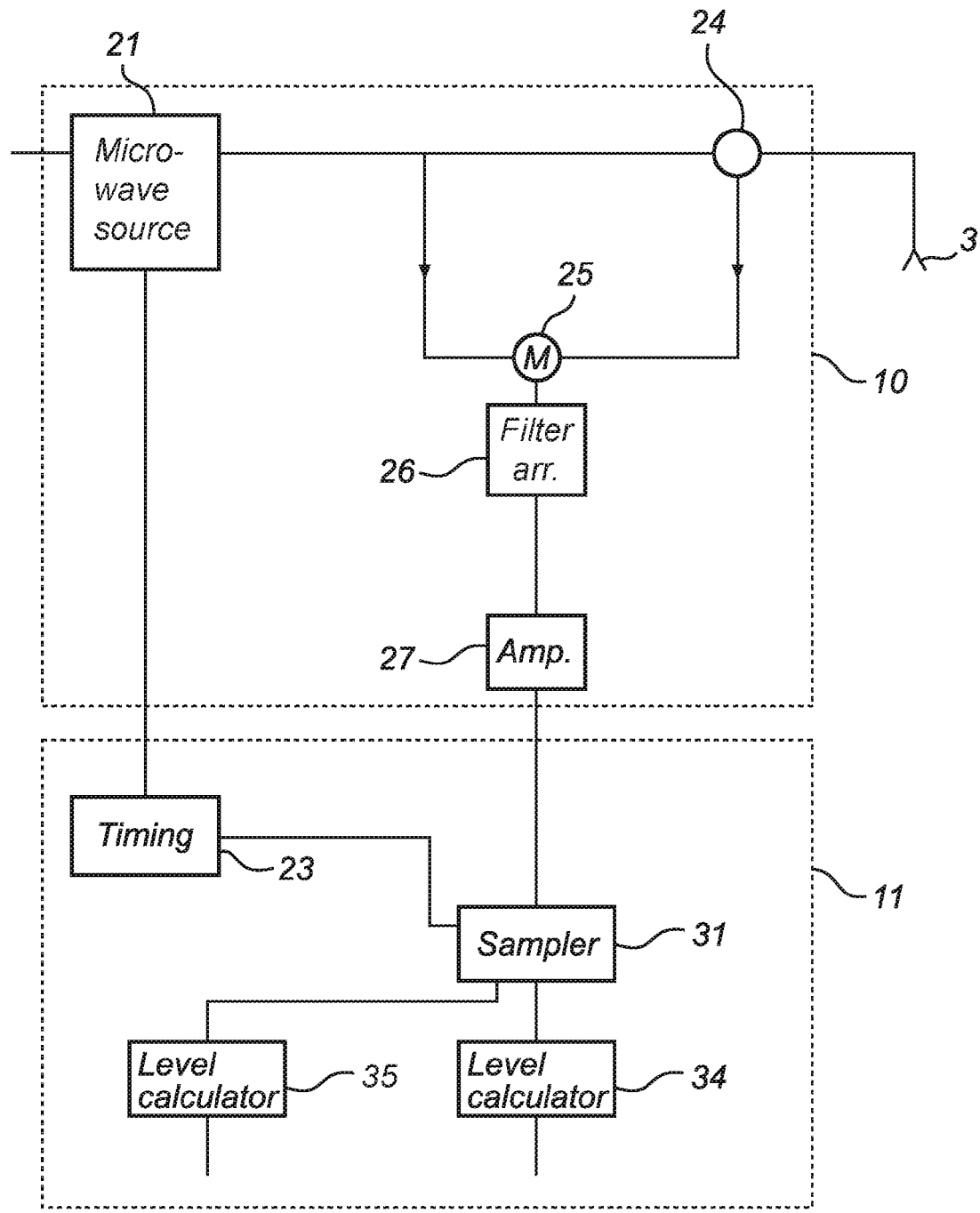
FIG. 2 is a schematic representation of the measurement electronics of FIG. 1.

Referring now to FIG. 2, there is shown a more detailed block diagram of the transceiver 10 and processing circuitry 11 in FIG. 2 according to one embodiment of the present invention.

The transceiver 10 here includes a microwave source 21, in turn controlled by timing circuitry 23 forming part of the processing circuitry 11. The microwave source 21 is connected to the antenna 3 via a power divider 24, and also to a mixer 25. The power divider 24 is arranged to connect a return signal from the antenna to the mixer 25, in order to allow the first mixer 25 to mix the transmitted signal from the microwave source 21 with the return signal and provide the intermediate frequency signal. The mixer 25 is connected to the filter arrangement 26, which will filter the intermediate frequency signal to provide a filtered intermediate frequency signal. The filter arrangement is in turn is connected an amplifier 27.

The filter arrangement 26 will in various embodiments comprise at least two high pass filters and at least one low pass filter. The filter characteristic of the filter arrangement using a first high pass filter at 3 kHz, a second high pass filter at 60 kHz and a low pass filter at 100 kHz is shown in FIG.

3. Variations of the filter arrangement 26 are of course possible, and the frequencies may be adjusted according to each application. In some embodiments a notch filter may be used to filter out the lower frequencies.

The processing circuitry 11 here includes, in addition to the timing circuitry 23 mentioned above, a sampler 31 adapted to receive and sample the signal from the amplifier 27. The sampler may comprise a sample-and-hold circuit in combination with an A/D-converter, or be realized as a sigma-delta converter. The sampler 31 may also additionally comprise an anti-aliasing filter, configured to further dampen frequency portions of signals which are above half the sampling frequency of the sampler 31. The sampler 31 is controlled by the timing circuitry to be synchronized with the measurement signal. Therefore, based upon the measurement signal being a measurement sweep or a diagnostic sweep, the sampler 31 will send the sampled signal to a level calculator block 34, or a self-diagnosis block 35. The level calculator block 34 will determine the distance based on the sampled signal from the sampler 31 and the self diagnosis block 35 will self diagnose the microwave chain and thus proof test the radar level gauge 1 based on the received sampled signal from the sampler 31. Generally, components which take part in generating, guiding, filtering, amplifying, transmitting and/or receiving electromagnetic microwaves are part of what is identified as the microwave chain. Hence, in the exemplary embodiments shown the microwave chain comprises at least the transceiver 10, as well as the timing circuit 23 and the sampler 31. It should be noted that the self diagnosis block 35 and the level calculator block 35 may functionally be one and the same unit.

While the elements of the transceiver 10 are typically implemented in hardware, and form part of an integrated unit normally referred to as a microwave unit, at least some portions of the processing circuitry 11 are typically embodied by software modules executed by an embedded processor. The invention is not restricted to this particular realization, and any implementation found suitable to realize the herein described functionality may be contemplated.

Figure 3:
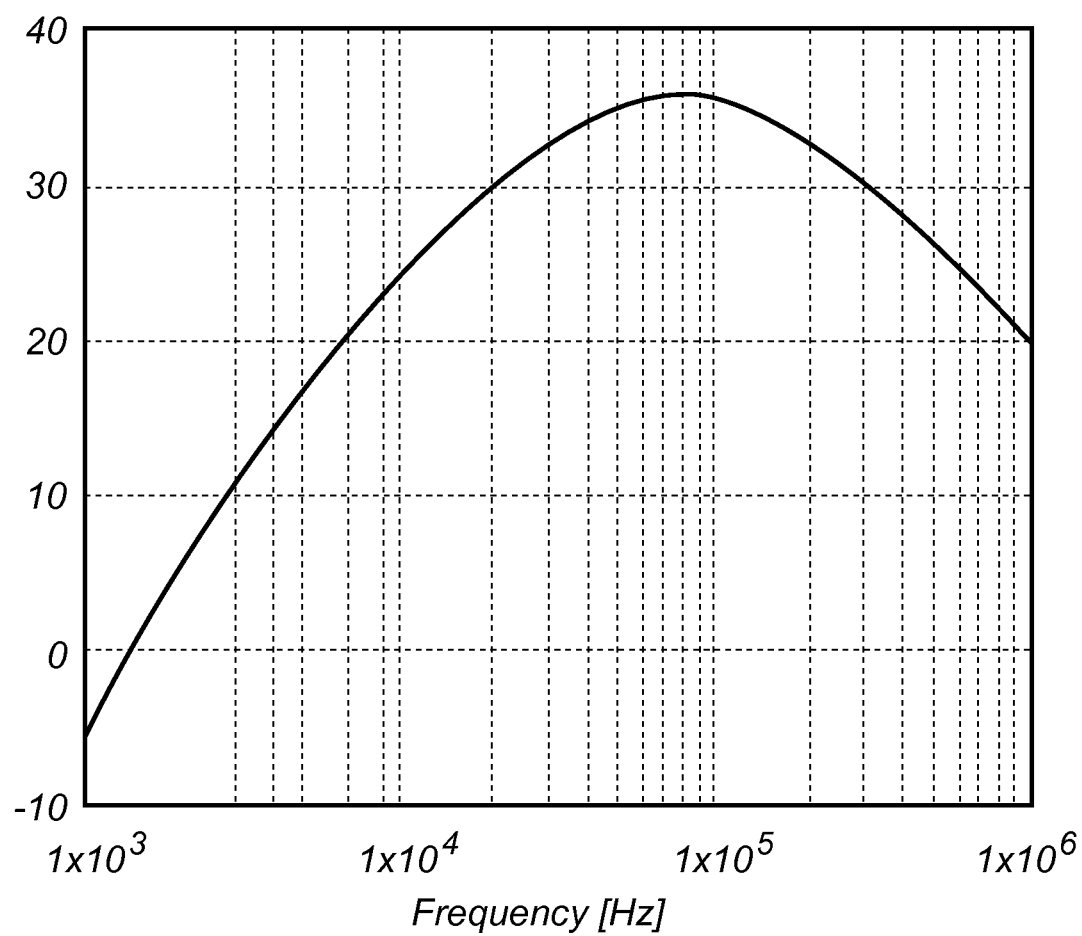
FIG. 3 is a schematic representation of the filter arrangement characteristics according to one embodiment of the invention.

The filter arrangement 26 and the filter characteristic of FIG. 3 will now be described in conjunction with Fast-Fourier transformed (FFT) intermediate frequency signals of a measurement sweep and of a diagnostic sweep which are plotted in graphs of amplitude in decibel versus frequency in FIGS. 4A-C. Note the detection limit marked by the dotted line 40 in FIGS. 4A-C which marks at which level an echo is actually detectable.

Figure 4A:
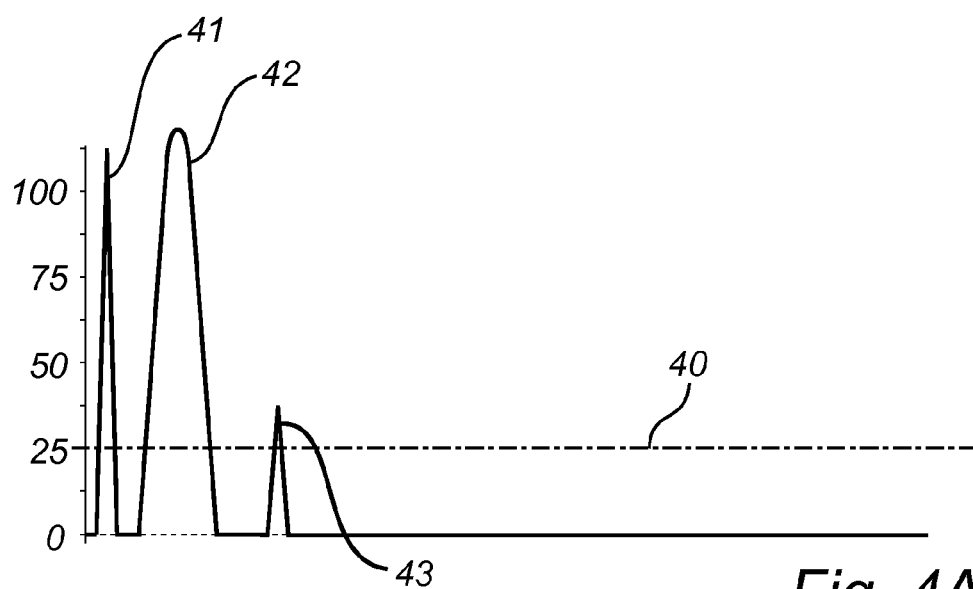
FIGS. 4A-C are schematic representations of a tank spectrum i.e. a Fast-Fourier transformed filtered intermediate frequency signal according to one embodiment of the present invention.

The graph in FIG. 4A represents a tank spectrum without an effective filter arrangement 26. The reference echo 41 is seen as the first echo above the detection limit, the second much larger echo 42 is the echo resulting from the connection to the antenna, hereafter antenna echo 42. Lastly, the much smaller echo 43 is actually the surface echo. Thus, it should be understood that without an effective filter arrangement 26, the surface echo 43 will be very hard to distinguish from the reference echo 41 and the antenna echo 42. In particular note that the surface echo 43 is relatively much closer to being below the detection limit 40. Further, the surface echo 43 in FIG. 4A represents a surface at a distance such that the echoes are separated for the sake of the explanation. In many cases the surface echo 43 will have a lower frequency, representing a smaller distance and be completely indistinguishable from the antenna echo 42.

Figure 4B:
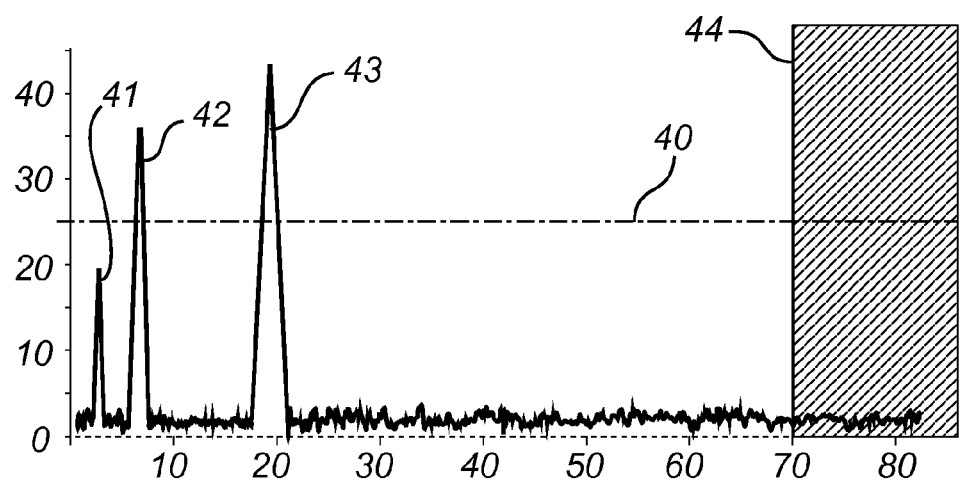

The graph in FIG. 4B represents a measurement sweep, where compared to FIG. 4A, the filter arrangement 26 through a first high pass filter, is configured to suppress unwanted near zone echoes as the reference echo 41. Note that the reference echo 41 is suppressed below the detection limit by the filter arrangement 26. This indicates that the reference echo 41 will be impossible to detect during a measurement sweep. The antenna echo 42 however is often strong enough to be detected above the detection limit 40. The antenna echo 42 is different for each antenna and may degrade and change over time depending on the tank atmosphere and/or buildup of product on the antenna, therefore the antenna echo 42 from the antenna connection is less suitable to use for the diagnostic functionality. The filter arrangement 26, through a second high pass filter, advantageously also compensates for the power loss as a function of distance in free wave propagation, also known as free-space path loss wherein the power decays according to an inverse square law. Thirdly, the filter arrangement 26, through a low pass filter limits the bandwidth of the signal to reduce the amount of noise which will be amplified by the amplifier 27. This bandwidth limit function of a low pass filter comprised in the filter arrangement 26, may additionally act as an anti-aliasing filter and suppress frequencies which are higher than half the sampling frequency of the processing circuitry 11. The requirement for the filter arrangement to suppress the higher frequencies will typically depend on the sampler 31. A sigma-delta converter may be driven at several MHz by an internal clock which is an order of magnitude faster than the sampling frequency and thus require no further suppression of high frequencies. Other types of samplers may require a built-in low pass filter for anti-aliasing to further suppress the frequencies. In at least one embodiment the sampler 31 is a successive approximation (SAR) ADC, and then may be oversampled and thus not require any additional suppression of higher frequencies.

The anti-aliasing feature is indicated by the grayed out area starting at an anti-aliasing frequency 44 of the filter arrangement 26.

Figure 4C:
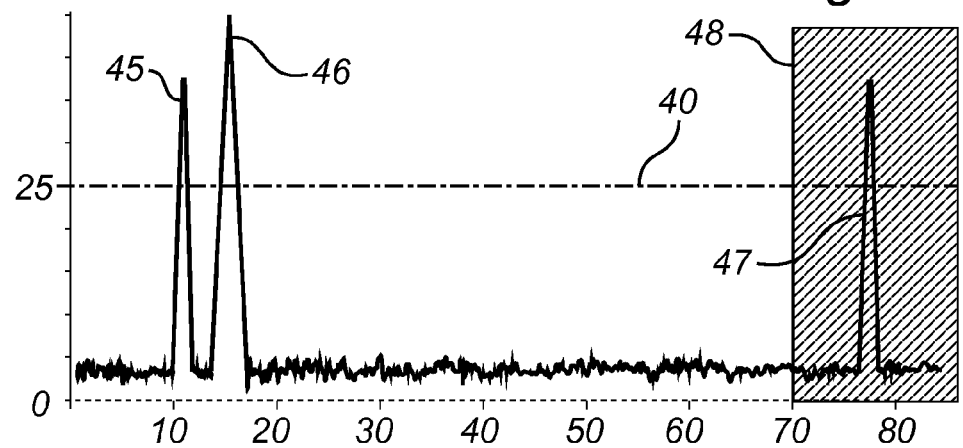

The graph in FIG. 4C represents a diagnostic sweep. Note that due to the higher frequency now induced to the reference echo 45, the reference echo 45 will be detectable above the detection limit as the filter arrangement 26 no longer suppresses the reference echo 45 to a large degree. The antenna echo 46 is still present. As the reference echo 45 is now detectable, it is also possible to use for a self-diagnostic function. However, note that during a diagnostic sweep the surface echo 47 will have a higher frequency and therefore may even be above the anti-aliasing frequency 44, 48 of the filter arrangement. Thus, the surface echo 47 may be filtered out by the low pass filter component of the filter arrangement 26. The surface echo 47 of FIG. 4C has been left at the original size for the sake of understanding the connection with the earlier figures. What occurs is that the surface echo 47, similar to the reference echo 41 in the measurement sweep, will be suppressed below the detection limit 40. Hence, if the frequency of the surface echo 47 is higher than the anti-aliasing frequency of the filter arrangement 26 and the sampler 31 at the indicated frequency 48, measurement of the distance L to the surface 7 may be rendered impossible during the diagnostic sweep.

The filtered intermediate frequency for the surface echo 43 in a measurement sweep may be the same as the filtered intermediate frequency for the reference echo 45 in a diagnostic sweep. Thus in the case of a measurement sweep the filtered intermediate frequency signal will be indicative of the distance to the surface, and in the diagnostic sweep the filtered intermediate signal will be indicative of the distance to the reference echo 45 which appear between the microwave source 21 and the antenna 3.

Figure 5A:
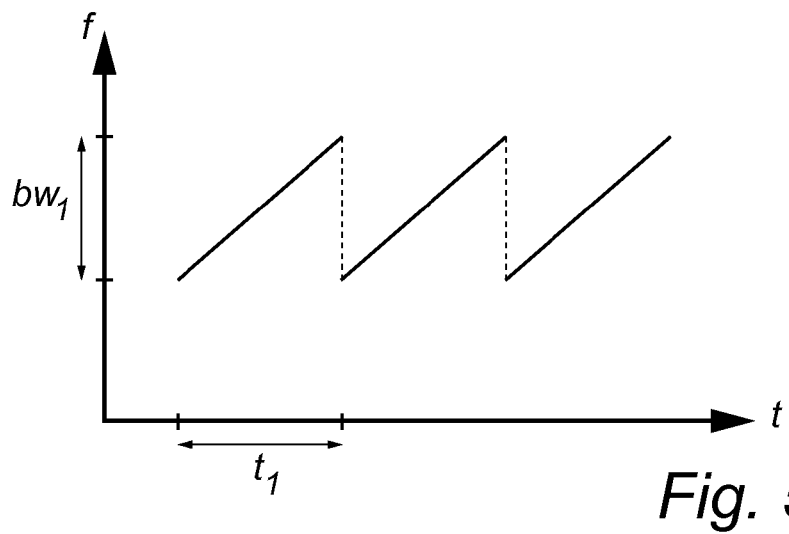
FIGS. 5A-C are schematic views of measurement sweeps and diagnostic sweeps according to embodiments of the invention.
Figure 5B:
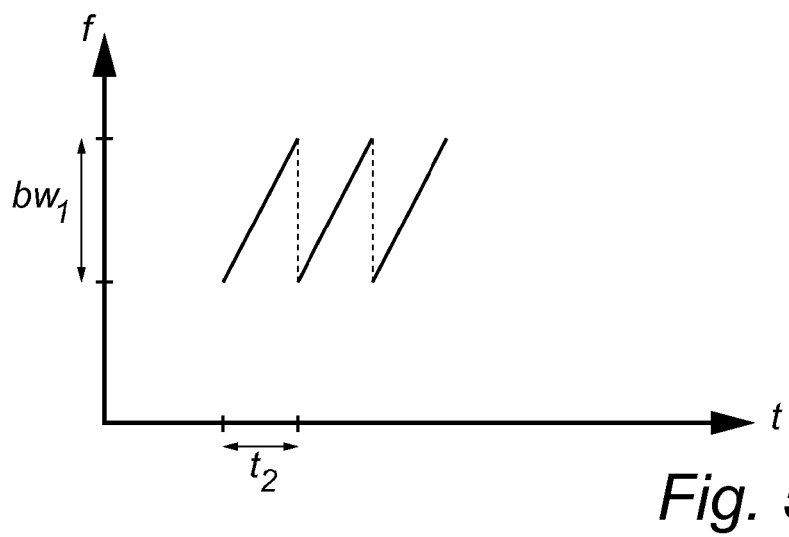
Figure 5C:
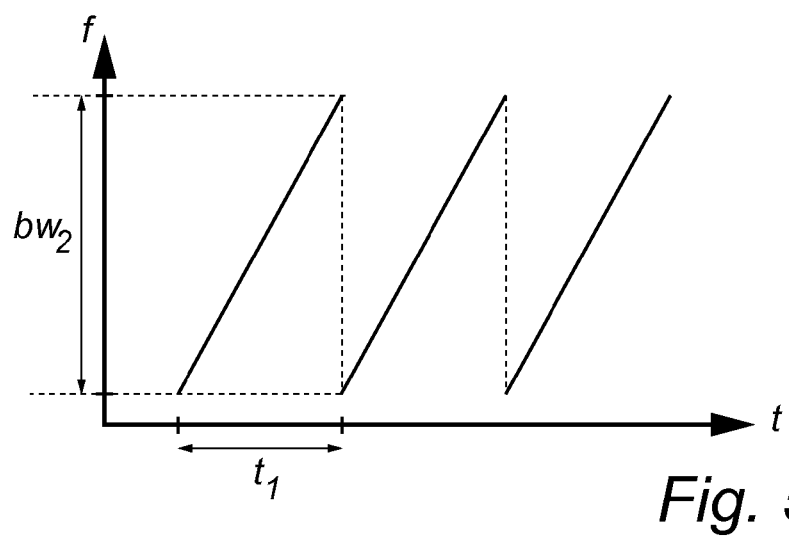

In FIGS. 5A to 5C there are graphs showing frequency plotted versus time and they represent the frequency sweeps generated by the microwave source 21 and sent out from the antenna 3. The frequency for an echo is related to the frequency sweep according to the following equation:

$$f = \frac{\lambda \cdot R \cdot h}{T \cdot c}$$

Where f is the frequency of the received intermediate frequency signal, c is the velocity of light in the present medium, h is the distance to the echo, T is the sweep time and B is the sweep bandwidth. Thus, a longer distance h will provide an echo with a higher frequency. As the speed of light and the distance to the echo are fixed, the present invention regards configuring the bandwidth B and/or sweep time T to perform a diagnostic sweep which enables the reference echo 45 to be detectable above the detection limit.

In FIG. 5A a measurement sweep is shown with a bandwidth $bw_1$ and a sweep time of $t_1$. The received signal having been mixed with the frequency sweep and filtered will produce a FFT similar to the one shown in FIG. 4B.

In FIG. 5B a diagnostic sweep is shown with a bandwidth $bw_1$ and a sweep time $t_2$ which is larger than $t_1$. The received signal having been mixed with the frequency sweep and filtered will produce a FFT similar to the one shown in FIG. 4C.

In FIG. 5C a representative diagnostic sweep is shown with a bandwidth $bw_2$ which is larger than $bw_1$ and a sweep time $t_1$. The received signal having been mixed with the frequency sweep and filtered will produce a FFT similar to the one shown in FIG. 4C.

A combination of the representative frequency sweeps in FIGS. 5B and C is of course also possible. It should now be readily apparent that by increasing the ratio between the bandwidth and the sweep time in the above equation the reference echo will have a higher frequency, which makes it detectable compared to an ordinary measurement sweep.

Figure 6:
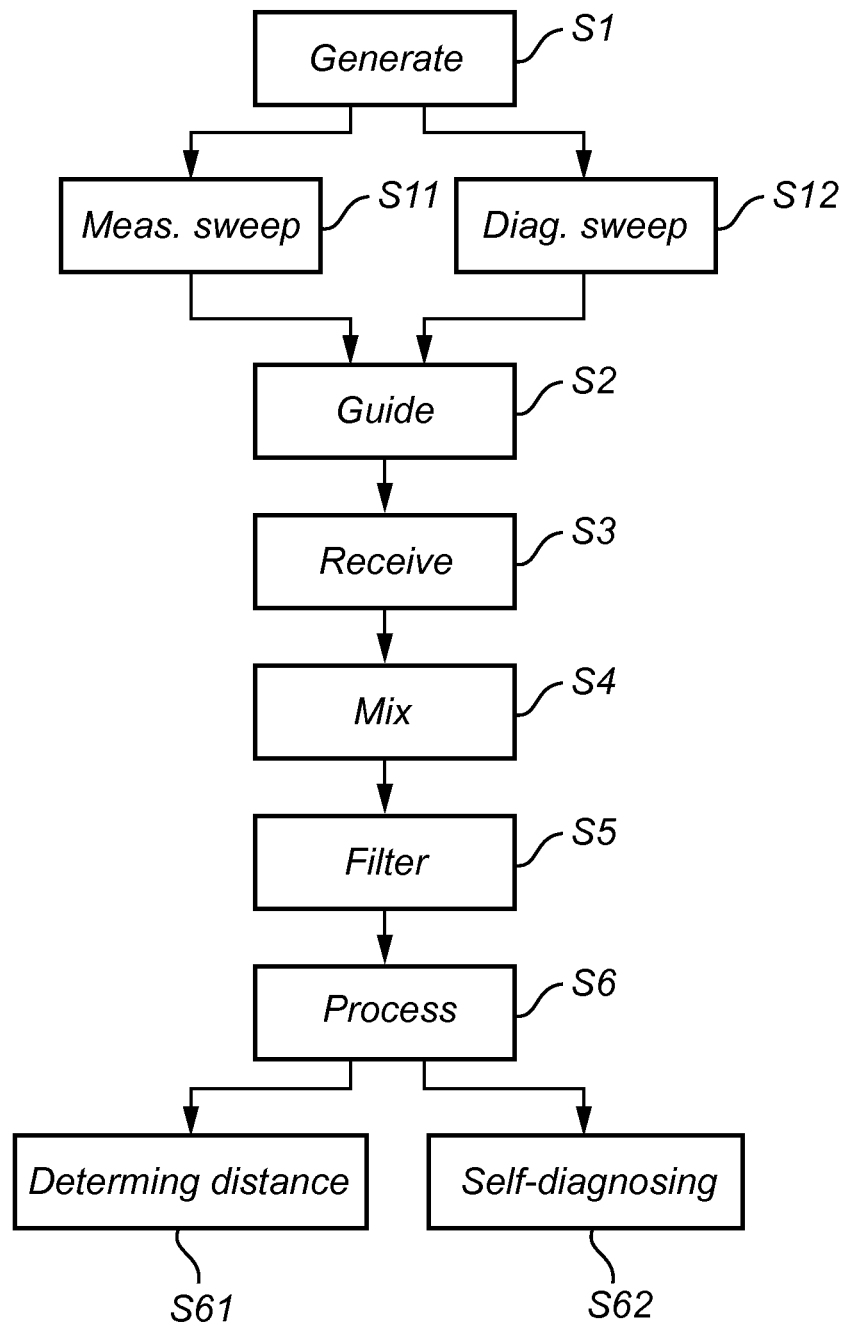
FIG. 6 is a flow chart of an embodiment according to another embodiment of the present invention.

Now referring to FIG. 6, which is a flowchart illustrating a method for providing a measurement of a distance to a surface of a product according to one embodiment of the present invention. First, the general steps S1-S6 of the method will be described, and then steps S11, S12, S61 and S62 will be elaborated upon.

First in step S1, the timing circuitry 23 controls the microwave source 21 to output a signal in the form of a stepped frequency sweep. The stepped frequency sweep is generated in the microwave source 21 which comprises a frequency stabilizing feedback loop. The frequency stabilizing feedback loop may in various embodiments be a phase locked loop (PLL). The signal can normally be stepped from a lower frequency to a higher frequency in suitable steps. In an alternative embodiment the signal may instead be stepped from a higher to a lower frequency. As an example, the frequency sweep may have a bandwidth in the order of a few GHz (e.g. 0.2-6 GHz), and an average frequency in the order of 25 GHz or 10 GHz. This number of steps N in the sweep may be in the range 100-4000, typically 200-2000, and may be around 1000 for a desired range of 30 m. The size of each frequency step (Δf) will thus typically be in the order of MHz. For a power limited application the duration of the sweep is limited, and is typically in the order of 0-100 ms. As an example, the duration of the measurement sweep may be around 5 ms, and with 500 frequency steps (N=500), this results in a duration for each step equal to 10 μs, or an update rate of around 100 kHz. The duration of the steps are controlled by the sampling frequency of the frequency stabilizing feedback loop in the microwave source 21. Hence, the duration for the frequency steps are usually fixed, and in order to provide a diagnostic sweep the number of steps and/or the start and stop frequency of the sweep is controlled. Therefore, to provide a diagnostic sweep with a shorter sweep time, at the same bandwidth, means that the number of steps is reduced but that the size of each frequency step (Δf) will be larger. In a similar manner, to provide a diagnostic sweep with a larger bandwidth, in the same amount of time, means that the same number of steps are performed, but that the size of each frequency step (Δf) will be larger.

Secondly, in step S2, the signal from the microwave source 21 is guided along the propagation path from the microwave source 21 to the antenna 3, and is emitted into the tank 5 as an electromagnetic transmit signal $S_T$ by the antenna 3 towards the surface 7.

Then, in step S3, a return signal $S_R$ traveling back from the surface 7 after being reflected, is received by the antenna 3 and sent along the waveguide 9 to the transceiver 10 and thus the power divider 24.

In step S4 the return signal $S_R$ is sent via the power divider 24 to the mixer 25 and is mixed with the signal to provide an intermediate frequency signal. The intermediate frequency signal is a piecewise constant oscillating signal, with a frequency proportional to the distance to the reflecting surface and the piecewise constant length is the same length as the signals step length. A typical frequency is in the order of kHz, e.g. less than 100 kHz, and typically less than 50 kHz.

In step S5, the intermediate frequency signal from the mixer 25, is filtered by the filter arrangement 26 which has been set allow intermediate frequency signals of a certain frequency to provide a filtered intermediate frequency. An exemplary characteristic of the filter arrangement may be seen in FIG. 3. An amplifier 27 then amplifies the filtered intermediate frequency signal.

Then, in step S6, the amplified filtered intermediate frequency signal is received by the processing circuitry 11, where it is sampled and A/D-converted by the sampler 31. The sampling frequency of the A/D-converter 30 is advantageously sufficiently close to the update rate of the signal, in order to sample each step of the signal once and only once. The sample vector resulting from the sampling is supplied to the self-diagnosis block 35 or the level calculator block 34 for further processing.

The timing circuitry 23 controls the microwave source 21 to generate either a measurement sweep or a diagnostic sweep. During a measurement sweep the method continues from step S1 to step S11 wherein an ordinary frequency sweep as discussed above is generated and output, an example is shown in FIG. 5A. If the timing circuitry 23 controls the microwave source 21 to generate a diagnostic sweep, the method would continue from step S1 to step S12 wherein a diagnostic sweep where the ratio between the bandwidth and sweep time of the diagnostic sweep is adjusted in order to enable echoes from the propagation path from the microwave source 21 to the antenna 3 to act as reference echoes. Examples of generated diagnostic sweeps are shown in FIGS. 5B and 5C.

Finally, the sampler 31 connected to the timing circuitry will either couple the sampled signal to the level calculator block 34 to perform step S61 of the method. Here the level calculator block 34 determines the frequency of the filtered intermediate frequency signal based on the sample vector, and then determines the distance to the reflecting surface (and subsequently the filling level of the product in the tank) based on the frequency of the filtered intermediate frequency signal. Or, in the case of a diagnostic sweep, the sampler 31 will couple the sampled signal to the self-diagnosis block 35 to perform step S62 of the method. Here the self diagnosis block 35 will determine if the radar level gauge is working properly. The self-diagnosis block 35 will compare the measured reference echo against a stored profile of the reference echo comprising the expected distance and/or expected amplitude. Hence, if the measured reference echo differs in any way from the stored value etc, the self-diagnosis block 35 will be able to determine that a component in the microwave chain is faulty.

The radar level gauge 1 may perform the self-diagnosis of the microwave chain as often as necessary, or as often as an operator deems proper. For example, the radar level gauge 1 may perform a diagnostic sweep at least once per hour or at least once per minute. Other intervals of performing diagnostic sweep are of course also possible, for instance such as performing diagnostic sweeps more or less often.

Although the figures may show a specific order of method steps, the order of the steps may differ from what is depicted. Also two or more steps may be performed concurrently or with partial concurrence. Such variation will depend on the software and hardware chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art. For example, the filter arrangement characteristic shown in FIG. 3 is one example the skilled addressee and person skilled in the art will easily understand that other suitable filter characteristics may also be contemplated. Variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

What is claimed is:

1. A self-diagnosing FMCW radar level gauge for measuring a distance to a surface of a product contained in a tank, said radar level gauge comprising:
    a transceiver arranged to generate and transmit an electromagnetic transmit signal in the form of a frequency sweep;
    a signal propagating device;
    a signal propagation path connecting said signal propagating device to said transceiver;
    wherein said signal propagation path and said signal propagating device are configured to guide said electromagnetic transmit signal towards said surface, and return an echo signal including reflections from said surface and an impedance transition in the signal propagation path;
    a mixer connected to said transceiver and configured to mix said echo signal with a portion of said electromagnetic transmit signal to provide an intermediate frequency signal;
    a filter arrangement connected to said mixer and configured to filter said intermediate frequency signal in order to provide a filtered intermediate frequency signal; and
    processing circuitry connected to said filter arrangement and configured to process said filtered intermediate frequency signal;
        wherein said frequency sweep is one of a diagnostic sweep and a measurement sweep, said diagnostic sweep is configured such that a reference echo is detectable in said filtered intermediate frequency signal, said reference echo being indicative of a distance to said impedance transition,
        said measurement sweep is configured such that said reference echo is suppressed in said filtered intermediate frequency signal, and that a surface echo is detectable in said filtered intermediate frequency signal, said surface echo being indicative of a distance to said surface;
    wherein said processing circuitry is configured to self-diagnose said radar level gauge based on the reference echo, and to determine the distance to said surface based on said surface echo.

2. The radar level gauge according to claim 1, wherein said processing circuitry further comprises a self-diagnosis block configured to compare said reference echo against a stored reference echo profile, said stored reference echo profile comprises an expected distance to said reference echo and/or an expected amplitude of said reference echo.

3. The radar level gauge according to claim 1, wherein said diagnostic sweep has a shorter sweep time than the measurement sweep.

4. The radar level gauge according to claim 3, wherein the diagnostic sweep time is at least two times shorter than the measurement sweep time.

5. The radar level gauge according to claim 3, wherein the diagnostic sweep time is at least four times shorter than the measurement sweep time.

6. The radar level gauge according to claim 1, wherein said diagnostic sweep has a larger sweep bandwidth than the measurement sweep.

7. The radar level gauge according to claim 6, wherein the diagnostic sweep bandwidth is at least two times greater than the measurement sweep bandwidth.

8. The radar level gauge according to claim 6, wherein the diagnostic sweep bandwidth is at least four times greater than the measurement sweep bandwidth.

9. The radar level gauge according to claim 1, wherein said frequency sweep only comprises frequencies in the range 24 to 27 GHz.

10. The radar level gauge according to claim 1, wherein said frequency sweep only comprises frequencies in the range 1 to 3 GHz.

11. The radar level gauge according to claim 1, wherein said frequency sweep only comprises frequencies in the range 9 to 11 GHz.

12. The radar level gauge according to claim 1, wherein said signal propagating device is one of a parabolic antenna, a horn antenna, or a patch antenna.

13. The radar level gauge according to claim 1, wherein said signal propagating device is one of a sommerfeld probe, a goubau probe, a coaxial probe, a twin-line probe or a still pipe.

14. The radar level gauge according to claim 1, wherein said diagnostic sweep is performed at least once per hour.

15. The radar level gauge according to claim 1, wherein said diagnostic sweep is performed at least once per minute.

16. The radar level gauge according to claim 1, wherein said filter arrangement comprises at least two high pass filters, and at least one low pass filter.

17. The radar level gauge according to claim 16, wherein one of said at least two high pass filters is set at 3 kHz and another of said at least two high pass filters is set at 60 kHz and one of said at least one low pass filter is set at 100 kHz.

18. A method for providing self-diagnosis of a FMCW radar level gauge for measuring a distance to a surface of a product contained in a tank, said method comprising:
generating an electromagnetic transmit signal in the form of a frequency sweep;
guiding said electromagnetic transmit signal via a signal propagation path and a signal propagating device towards said surface;
returning an echo signal including reflections from said surface and an impedance transition in the signal propagation path;
mixing said echo signal and said transmit signal to provide an intermediate frequency signal;
filtering said intermediate frequency signal to provide a filtered intermediate frequency signal,
wherein said generated frequency sweep is one of a diagnostic sweep and a measurement sweep,
said diagnostic sweep is configured such that a reference echo is detectable in said filtered intermediate frequency signal, said reference echo being indicative of a distance to said impedance transition,
said measurement sweep is configured such that said reference echo is suppressed in said filtered intermediate frequency signal, and that a surface echo is detectable in said filtered intermediate frequency signal, said surface echo being indicative of a distance to said surface;
processing said filtered intermediate frequency signal to self-diagnose said radar level gauge based on the reference echo, and to determine the distance to said surface based on said surface echo.

19. The method according to claim 18, wherein said step of processing said filtered intermediate frequency signal to self-diagnose said radar level gauge comprises comparing said reference echo against a stored reference echo profile, said stored reference echo profile including an expected distance to said reference echo and/or an expected amplitude of said reference echo.

20. The method according to claim 18, wherein said diagnostic sweep has a shorter sweep time than the measurement sweep.

21. The method according to claim 20, wherein the diagnostic sweep time is at least two times shorter than the measurement sweep time.

22. The method according to claim 20, wherein the diagnostic sweep time is at least four times shorter than the measurement sweep time.

23. The method according to claim 18, wherein said diagnostic sweep has a larger sweep bandwidth than the measurement sweep.

24. The method according to claim 23, wherein the diagnostic sweep bandwidth is at least two times greater than the measurement sweep bandwidth.

25. The method according to claim 23, wherein the diagnostic sweep bandwidth is at least four times greater than the measurement sweep bandwidth.

26. The method according to claim 18, wherein said frequency sweep only comprises frequencies in the range 24 to 27 GHz.

27. The method according to claim 18, wherein said frequency sweep only comprises frequencies in the range 1 to 3 GHz.

28. The method according to claim 18, wherein said frequency sweep only comprises frequencies in the range 9 to 11 GHz.

* * * * *